United States Patent
Koshinaka et al.

(10) Patent No.: US 11,900,949 B2
(45) Date of Patent: Feb. 13, 2024

(54) SIGNAL EXTRACTION SYSTEM, SIGNAL EXTRACTION LEARNING METHOD, AND SIGNAL EXTRACTION LEARNING PROGRAM

(71) Applicant: NEC Corporation, Tokyo (JP)

(72) Inventors: Takafumi Koshinaka, Tokyo (JP); Hitoshi Yamamoto, Tokyo (JP); Kaoru Koida, Tokyo (JP); Takayuki Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 265 days.

(21) Appl. No.: 17/612,736

(22) PCT Filed: May 28, 2019

(86) PCT No.: PCT/JP2019/021038
§ 371 (c)(1),
(2) Date: Nov. 19, 2021

(87) PCT Pub. No.: WO2020/240682
PCT Pub. Date: Dec. 3, 2020

(65) Prior Publication Data
US 2022/0238119 A1     Jul. 28, 2022

(51) Int. Cl.
*G10L 15/02*     (2006.01)
*G10L 17/18*     (2013.01)
(Continued)

(52) U.S. Cl.
CPC .............. *G10L 17/18* (2013.01); *G10L 17/02* (2013.01); *G10L 17/04* (2013.01); *G10L 17/10* (2013.01); *G10L 25/18* (2013.01)

(58) Field of Classification Search
CPC .......... G06N 3/04; G06N 3/044; G06N 3/045; G06N 3/08; G10L 15/02; G10L 15/063; G10L 15/16; G10L 25/30; G10L 21/0272
See application file for complete search history.

(56) References Cited

U.S. PATENT DOCUMENTS

2017/0061978 A1* 3/2017 Wang ................. G10L 21/0232
2017/0162194 A1    6/2017 Nesta et al.
(Continued)

FOREIGN PATENT DOCUMENTS

| EP | 3767619 | 1/2021 |
| JP | 2018-508799 A | 3/2018 |
| WO | 2019/017403 A1 | 1/2019 |

OTHER PUBLICATIONS

Jun Wang et al., "Deep Extractor Network for Target Speaker Recovery From Single Channel Speech Mixtures", Interspeech 2018, Sep. 2-6, 2018, Hyderabad, pp. 307-311.
(Continued)

*Primary Examiner* — Jakieda R Jackson
(74) *Attorney, Agent, or Firm* — Sughrue Mion, PLLC

(57) ABSTRACT

A neural network input unit 81 inputs a neural network in which a first network having a layer for inputting an anchor signal belonging to a predetermined class and a mixed signal including a target signal belonging to the class and a layer for outputting, as an estimation result, a reconstruction mask indicating a time-frequency domain in which the target signal is present in the mixed signal, and a second network having a layer for inputting the target signal extracted by applying the mixed signal to the reconstruction mask and a layer for outputting a result obtained by classifying the input target signal into a predetermined class are combined. A reconstruction mask estimation unit 82 applies the anchor signal and mixed signal to the first network to estimate the reconstruction mask of the class to which the anchor signal belongs. A signal classification unit 83 applies the mixed signal to the estimated reconstruction mask to extract the target signal, and applies the extracted target signal to the second network to classify the target signal into the class.

10 Claims, 8 Drawing Sheets

(51) Int. Cl.
*G10L 17/02* (2013.01)
*G10L 17/04* (2013.01)
*G10L 17/10* (2013.01)
*G10L 25/18* (2013.01)

(56) References Cited

U.S. PATENT DOCUMENTS

2018/0336888 A1 11/2018 Jiang et al.
2019/0066713 A1* 2/2019 Mesgarani .............. G10L 17/26
2019/0318754 A1* 10/2019 Le Roux .................. G10L 19/02

OTHER PUBLICATIONS

David Snyder et al., "X-Vectors: Robust DNN Embeddings for Speaker Recognition", ICASSP 2018—2018 IEEE International Conference on Acoustics, Speech and Signal Processing (ICASSP), Apr. 2018.
International Search Report for PCT Application No. PCT/JP2019/021038, dated Jul. 16, 2019.
Indian Office Action for IN Application No. 202117054810, dated Sep. 23, 2022 with English Translation.
Extended European Search Report for EP Application No. 19930251.4 dated May 13, 2022.
Wei Rao et al., Target Speaker Extraction for Overlapped Multi-Talker Speaker Verification, Feb. 7, 2019.
Wang Quan et al., VoiceFilter: Targeted Voice Separation by Speaker-Conditioned Spectrogram Masking, Interspeech 2019, Sep. 15-19, 2019, pp. 2728-2732.
Zmolikova Katerina et al., Learning speaker representation for neural network based multichannel speaker extraction, 2017 IEEE Automatic Speech Recognition and Understanding Workshop (ASRU), IEEE, Dec. 16, 2017, pp. 8-15.

* cited by examiner

SIGNAL EXTRACTION SYSTEM, SIGNAL EXTRACTION LEARNING METHOD, AND SIGNAL EXTRACTION LEARNING PROGRAM This application is a National Stage Entry of PCT/JP2019/021038 filed on May 28, 2019, the contents of all of which are incorporated herein by reference, in their entirety.

TECHNICAL FIELD

The disclosure relates to a signal extraction system, a signal extraction learning method, and a signal extraction learning program for extracting a signal belonging to each class.

BACKGROUND ART

Various techniques for extracting a signal belonging to each class from an observed signal are known. For example, speaker diarization is a technique for analyzing an audio signal of which information on a speaker (the number of speakers or the like) is unknown and estimating which speaker speaks and when the speaker speaks, and is a technique for specifying a set of segments for each speaker from the audio signal.

As a general method of the speaker diarization, there is a method for specifying the set of segments of each speaker by segmenting the audio signal and clustering the segmented audio signals.

FIG. 10 is an explanatory diagram illustrating a method for specifying the audio signal of the speaker from the segmented audio signals. In the method illustrated in FIG. 10, segmentation for extracting an audio portion is performed on a monaural audio stream 201. FIG. 10 illustrates an example in which four segments 202 to 205 are extracted. Here, the segment 202, the segment 203 and the segment 205, and the segment 204 are determined to be similar signals and are clustered. As a result, the former segment is specified as a speaker A, and the latter segment is specified as a speaker B.

On the other hand, the clustering of the segments as illustrated in FIG. 10 is influenced by noise, and has a problem that temporarily overlapping audio signals of speakers cannot be separated. In order to cope with such a problem, a method for specifying an audio signal by using an audio signal (also be referred to as an anchor) of a target speaker has also been proposed.

FIG. 11 is an explanatory diagram illustrating a method for specifying an audio signal of a speaker by using an anchor. In the method illustrated in FIG. 11, an anchor 206 that is the audio signal of the target speaker A to be specified is prepared for the monaural audio stream 201. The set of segments (segment 207, segment 208, and segment 209) of the speaker A is specified by comparing the audio stream 201 with the anchor 206.

NPL 1 describes a method for extracting an audio signal of a speaker by using a deep learning technique. In the method described in NPL 1, a mask (reconstruction mask) for extracting an audio signal (segment) of a target speaker is learned based on an anchor that is the audio signal of the target speaker and a mixed audio signal. The set of segments of the target speaker is specified by applying the learned reconstruction mask to the mixed audio signal.

NPL 2 describes a method for extracting a feature value from an input audio.

CITATION LIST

Non Patent Literature

NPL 1: Jun Wang, et al., "Deep Extractor Network for Target Speaker Recovery From Single Channel Speech Mixtures", Interspeech 2018, 2-6 Sep. 2018.
NPL 2: David Snyder et al., "X-Vectors: Robust DNN Embeddings for Speaker Recognition", ICASSP 2018-2018 IEEE International Conference on Acoustics, Speech and Signal Processing (ICASSP), April 2018.

SUMMARY

Technical Problem

In the method described in NPL 1, a reconstruction mask $M_{f,t}$ is learned based on an anchor $X_{f,t}^{as}$ of the speaker represented in two dimensions of time-frequency and a mixed audio signal $X_{f,t}^{ms}$. A spectrogram $\hat{S}_{f,t}^{ms}$ of the speaker is estimated ($\hat{S}$ represents a superscript hat of S) by applying the learned reconstruction mask $M_{f,t}$ to the mixed audio signal $X_{f,t}^{ms}$. Specifically, the spectrogram $\hat{S}_{f,t}^{ms}$ of the speaker is calculated based on Expression 1 to be illustrated below.

[Math. 1]

$$\hat{S}_{f,t}^{ms} = M_{f,t} \times X_{f,t}^{ms} \qquad \text{(Equation 1)}$$

At the time of learning, the reconstruction mask is learned by optimizing a loss function of Expression 2 to be illustrated below to be minimized. $S_{f,t}^{ms}$ in Expression 2 is a spectrogram of the speaker. Specifically, the neural network described in NPL 1 learns a reconstruction mask that can handle overlapping utterances from irrelevant noises.

[Math. 2]

$$L = \Sigma_{f,t} \| S_{f,t}^{ms} - M_{f,t} \times X_{f,t}^{ms} \|^2 \qquad \text{(Equation 2)}$$

However, a true value (ground truth) of the reconstruction mask $M_{f,t}$ included in Expression 2 described above and a true value of the spectrogram $S_{f,t}^{ms}$ of the speaker to be reconstructed are generally unknown. Thus, in the optimization using Expression 2 described above, there is a problem that there is a limit to improving the accuracy of the reconstruction mask.

It is also conceivable to improve the accuracy of the reconstruction mask by artificially generating learning data in which a plurality of (for example, two) audio signals are superimposed. However, since it is difficult for artificial data to sufficiently reflect factors (for example, conversation exchange, reverberation, and the like) present in actual data, even though learning is performed using the artificial data, it is difficult to generate a reconstruction mask capable of extracting the audio signal of the target speaker from an actual environmental sound.

Therefore, an object of the disclosure is to provide a signal extraction system, a signal extraction learning method, and a signal extraction learning program capable of accurately extracting a signal belonging to each class from an observed signal.

Solution to Problem

A signal extraction system according to the disclosure includes a neural network input unit that inputs a neural network in which a first network having a layer for inputting an anchor signal belonging to a predetermined class and a mixed signal including a target signal belonging to the class and a layer for outputting, as an estimation result, a reconstruction mask indicating a time-frequency domain in which the target signal is present in the mixed signal and a second network having a layer for inputting the target signal extracted by applying the mixed signal to the reconstruction mask and a layer for outputting a result obtained by classifying the input target signal into a predetermined class are combined, a reconstruction mask estimation unit that applies an anchor signal and the mixed signal to the first network to estimate a reconstruction mask of a class to which the anchor signal belongs, a signal classification unit that applies the mixed signal to the estimated reconstruction mask to extract a target signal, and applies the extracted target signal to the second network to classify the target signal into a class, a loss calculation unit that calculates a loss function between the class to which the extracted target signal is classified and a true class, a parameter update unit that updates a parameter of the first network and a parameter of the second network in the neural network based on the calculation result of the loss function, and an output unit that outputs the updated first network.

A signal extraction learning method according to the disclosure includes inputting a neural network in which a first network having a layer for inputting an anchor signal belonging to a predetermined class and a mixed signal including a target signal belonging to the class and a layer for outputting, as an estimation result, a reconstruction mask indicating a time-frequency domain in which the target signal is present in the mixed signal and a second network having a layer for inputting the target signal extracted by applying the mixed signal to the reconstruction mask and a layer for outputting a result obtained by classifying the input target signal into a predetermined class are combined, applying an anchor signal and the mixed signal to the first network to estimate a reconstruction mask of a class to which the anchor signal belongs, applying the mixed signal to the estimated reconstruction mask to extract a target signal, and applying the extracted target signal to the second network to classify the target signal into a class, calculating a loss function between the class to which the extracted target signal is classified and a true class, updating a parameter of the first network and a parameter of the second network in the neural network based on the calculation result of the loss function, and outputting the updated first network.

A signal extraction learning program according to the disclosure causes a computer to execute neural network input processing of inputting a neural network in which a first network having a layer for inputting an anchor signal belonging to a predetermined class and a mixed signal including a target signal belonging to the class and a layer for outputting, as an estimation result, a reconstruction mask indicating a time-frequency domain in which the target signal is present in the mixed signal and a second network having a layer for inputting the target signal extracted by applying the mixed signal to the reconstruction mask and a layer for outputting a result obtained by classifying the input target signal into a predetermined class are combined, reconstruction mask estimation processing of applying an anchor signal and the mixed signal to the first network to estimate a reconstruction mask of a class to which the anchor signal belongs, signal classification processing of applying the mixed signal to the estimated reconstruction mask to extract a target signal, and applying the extracted target signal to the second network to classify the target signal into a class, loss calculation processing of calculating a loss function between the class to which the extracted target signal is classified and a true class, parameter update processing of updating a parameter of the first network and a parameter of the second network in the neural network based on the calculation result of the loss function, and output processing of outputting the updated first network.

Advantageous Effects

According to the disclosure, a signal belonging to each class can be accurately extracted from an observed signal.

DESCRIPTION OF EMBODIMENTS

Hereinafter, exemplary embodiments of the disclosure will be described with reference to the drawings. In the following description, a method for extracting an audio signal (segment) of each speaker from an audio stream will be described as a specific example in which a signal belonging to each class is extracted from an observed signal. However, the signal as an extraction target by the disclosure is not limited to an audio signal.

First Exemplary Embodiment

Figure 1:
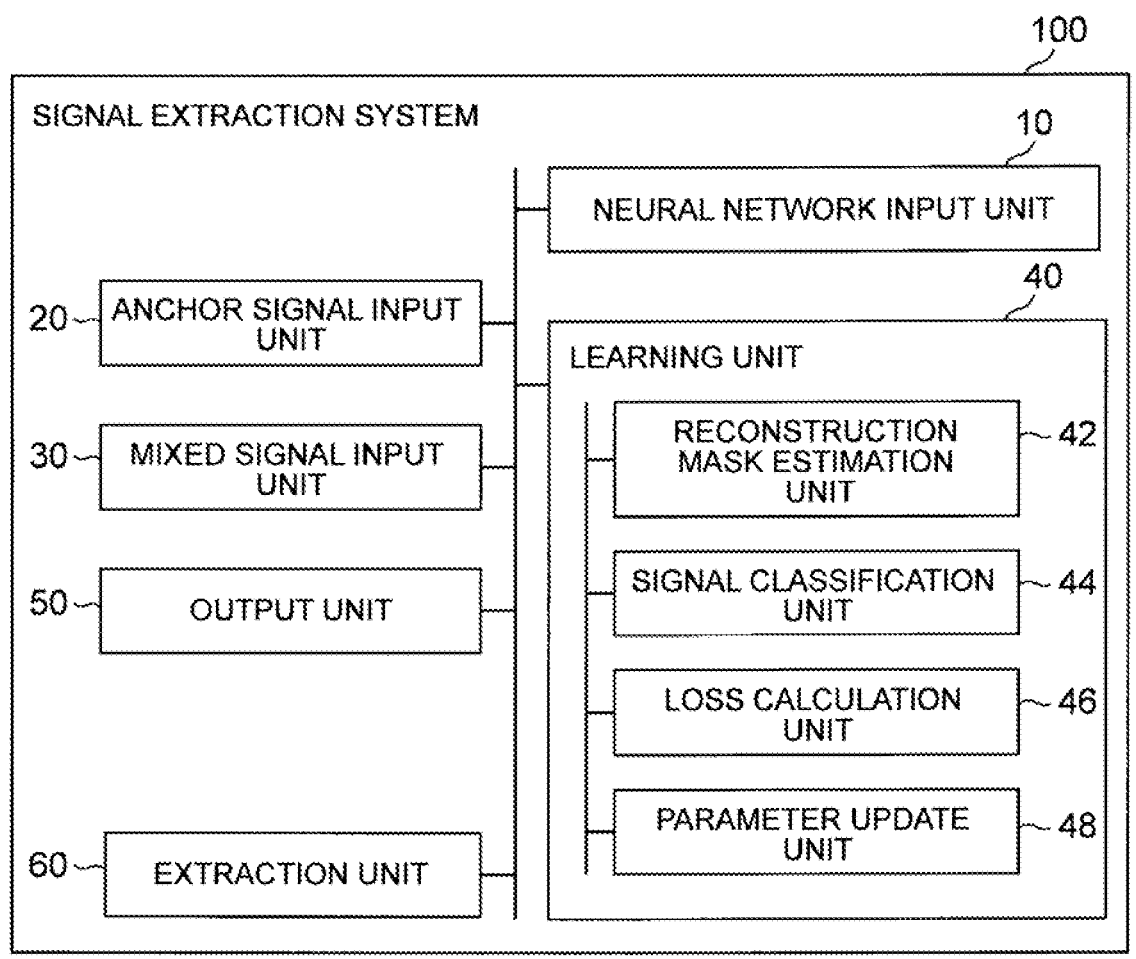
FIG. 1 It depicts a block diagram illustrating a configuration example of a first exemplary embodiment of a signal extraction system according to the disclosure.

FIG. 1 is a block diagram illustrating a configuration example of a first exemplary embodiment of a signal extraction system according to the disclosure. A signal extraction system 100 according to the exemplary embodiment includes a neural network input unit 10, an anchor signal input unit 20, a mixed signal input unit 30, a learning unit 40, an output unit 50, and an extraction unit 60.

The neural network input unit 10 inputs a neural network for extracting a signal belonging to a certain class. In the exemplary embodiment, the class means a set of signals having a certain specified property. In the case of the audio signal, the class is specifically an individual speaker, a gender, an age, a language, an emotion, or the like. For example, when a speaker A is determined as the class, a signal indicating the utterance of the speaker A is a signal belonging to the class of the speaker A.

The neural network input in the exemplary embodiment is a neural network in which two types of networks are combined. A first network includes a layer for inputting an anchor signal belonging to a predetermined class and a mixed signal including a signal (hereinafter, referred to as a target signal) belonging to the class, and a layer for outputting, as an estimation result, a mask (hereinafter, referred to as a reconstruction mask) indicating a time-frequency domain in which the target signal is present in the input mixed signal. The time-frequency domain indicates a region that can be specified from a signal based on a time and a frequency. For example, when the speaker A is determined as the class, the target signal is a signal indicating the utterance of the speaker A.

A specific example of the first network is a convolutional neural network (CNN). In particular, when an audio stream is assumed as the mixed signal, it is conceivable that a length of the signal becomes variable. Thus, it is preferable to use a time delay neural network (TDNN) which is a one-dimensional convolutional neural network model (1D CNN) for the first network. The first network may be a network that inputs a mixed signal obtained by dividing the mixed signal by a predetermined length (for example, four seconds or the like).

A second network includes a layer for inputting the target signal extracted by applying the mixed signal to the reconstruction mask, and a layer for outputting a result obtained by classifying the input target signal into a predetermined class. Accordingly, it can be said that the input neural network in the exemplary embodiment is a neural network having the anchor signal and the mixed signal as inputs and the class into which the extracted target signal is classified as an output.

Specifically, the second network has a layer in which an output corresponding to the number of classes assumed as extraction targets, that is, an output corresponding to each of all or a part of classes included in learning data to be referred to in the learning unit 40 to be described later is set. As exception processing, it is assumed that the mixed signal does not include signals of any assumed class, the second network may have a layer in which an output obtained by adding one to the number of classes assumed as the extraction targets is set. This added output is an output for detecting the exception processing.

Figure 2:
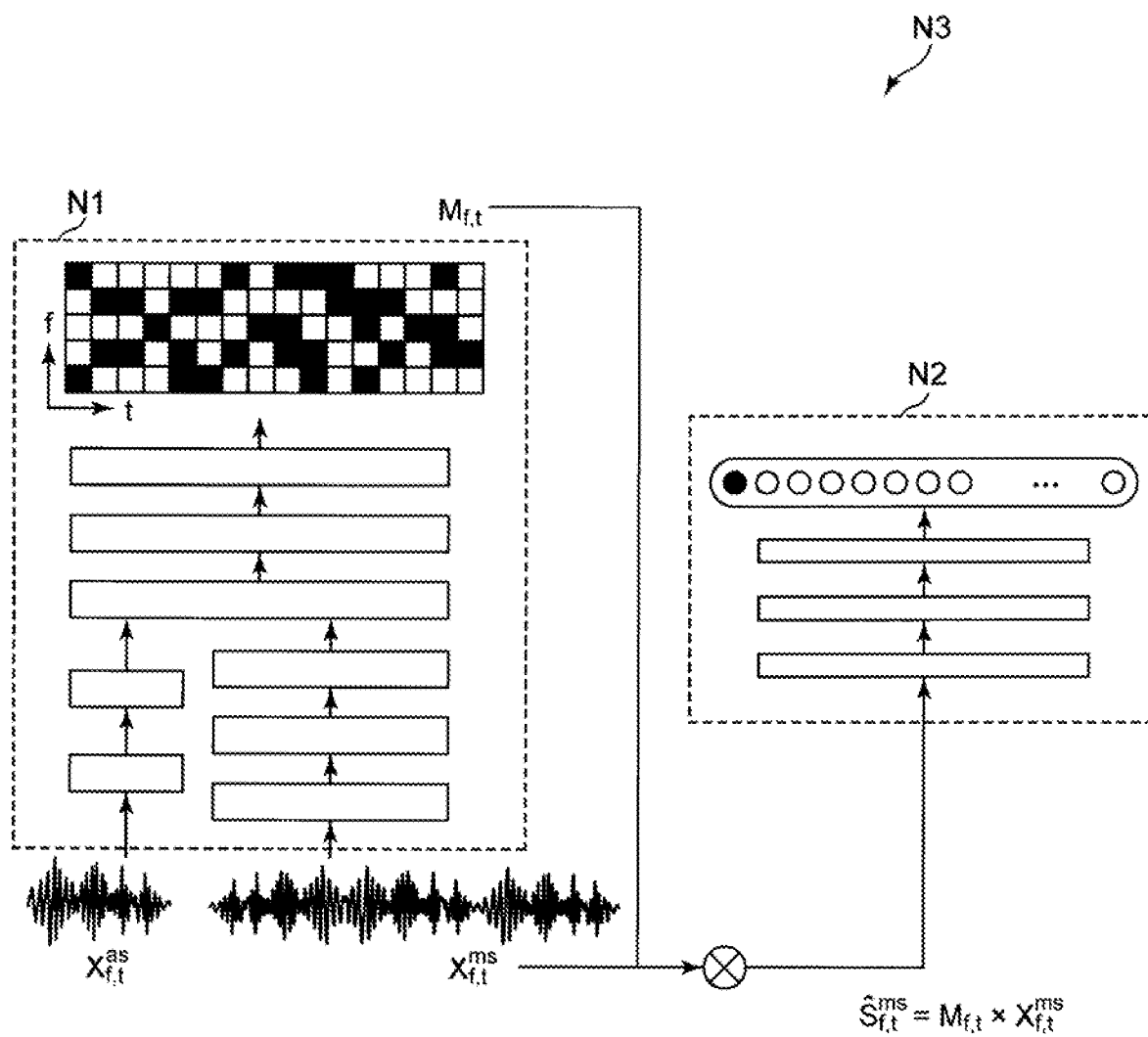
FIG. 2 It depicts an explanatory diagram illustrating an example of an input neural network.

FIG. 2 is an explanatory diagram illustrating an example of the input neural network. A first network N1 illustrated in FIG. 2 is a network in which an utterance $X_{f,t}^{as}$ of the speaker as the anchor signal and a mixed audio $X_{f,t}^{ms}$ including the utterance of the speaker are input and a reconstruction mask $M_{f,t}$ is output. A second network N2 is a network in which a signal $\hat{S}_{f,t}^{ms}$ indicating the utterance of the speaker extracted by applying the mixed audio $X_{f,t}^{ms}$ to the reconstruction mask $M_{f,t}$ are input and a result obtained by classifying the input signal into a predetermined class is output. These two types of networks are combined to constitute one neural network N3.

The anchor signal input unit 20 inputs the anchor signal to be input to the neural network. Specifically, the anchor signal input unit 20 inputs the anchor signal belonging to the class as the extraction target by using the reconstruction mask. In other words, the reconstruction mask for extracting the class to which the input anchor signal belongs is learned by the learning unit 40 to be described later. In the example illustrated in FIG. 2, the utterance $X_{f,t}^{as}$ corresponds to the anchor signal.

The mixed signal input unit 30 inputs the signal (that is, the mixed signal) including the target signal to be extracted. In the example illustrated in FIG. 2, the mixed audio $X_{f,t}^{ms}$ corresponds to the mixed signal.

The learning unit 40 learns the entire neural network including two types of networks. Since the reconstruction mask as a target is unknown, the learning unit 40 according to the exemplary embodiment performs learning with a weak label with a label of the class to be classified as a target. The learning unit 40 includes a reconstruction mask estimation unit 42, a signal classification unit 44, a loss calculation unit 46, and a parameter update unit 48.

The reconstruction mask estimation unit 42 applies the input anchor signal and mixed signal to the first network, and estimates the reconstruction mask of the class to which the anchor signal belongs. Specifically, the reconstruction mask estimation unit 42 estimates the output of the first network in the neural network as the reconstruction mask.

The signal classification unit 44 applies the mixed signal to the estimated reconstruction mask to extract the target signal, and applies the extracted target signal to the second network to classify the target signal into the class. Specifically, the signal classification unit 44 acquires the output of the second network in the neural network as the class into which the target signal is classified. For example, when the mixed signal is the audio stream indicating the utterance of the speaker, the signal classification unit 44 extracts a spectrogram of the speaker as the target signal, and applies the extracted spectrogram to the second network to classify the speaker.

The loss calculation unit 46 calculates a loss function between the class into which the extracted target signal is classified and a true class. The true class is a class to which the input anchor signal belongs. For example, the loss calculation unit 46 may calculate the loss function by using a cross entropy illustrated in the following Expression 3.

[Math. 3]

$$L' = -\Sigma_i c_i \log \hat{c}_i \quad \text{(Equation 3)}$$

In Expression 3, $c_i$ is true label information of the anchor signal, and takes a value of 1 when the anchor signal belongs to an i-th class, or a value of 0 otherwise. $\hat{c}_i$ is label information of the classified class, and is an output value of each element of an output layer of the second network. This output value is desirably normalized by a softmax activation function or the like in the second network. The label information is assigned by the signal classification unit 44 and is set in advance to the anchor signal.

The parameter update unit 48 updates a parameter of the first network and a parameter of the second network in the neural network based on the calculation result of the loss function. Specifically, the parameter update unit 48 updates the parameters in the neural network so as to minimize the loss function. The parameter update unit 48 may update the parameters by, for example, a backpropagation method. However, the method for updating the parameters is not limited to the backpropagation method, and the parameter update unit 48 may update the parameters by using a generally known method.

The output unit 50 outputs the updated first network. That is, the output unit 50 outputs a neural network obtained by removing, from the input neural network, a network (that is, the second network) for classifying the target signal into the class.

The extraction unit 60 applies the anchor signal and the mixed signal to the output first network, and extracts the signal (target signal) of the class to which the anchor signal belongs. The extracted signal can be used for speaker identification, for example.

For example, in the method described in NPL 1, processing of optimizing the loss function illustrated in Expression 2 described above is performed. However, as described above, since true values of the reconstruction mask $M_{f,t}$ and the spectrogram $S_{f,t}^{ms}$ of the speaker to be reconstructed are generally unknown, there is a limit to improving the accuracy of the reconstruction mask. On the other hand, in the exemplary embodiment, the learning unit 40 learns the neural network so as to optimize the loss function (that is, the loss function between the classes) of Expression 3 described above. Thus, it is possible to learn the reconstruction mask that can accurately extract the signal belonging to each class from an observed signal.

The neural network input unit 10, the anchor signal input unit 20, the mixed signal input unit 30, the learning unit 40 (more specifically, the reconstruction mask estimation unit 42, the signal classification unit 44, the loss calculation unit 46, and the parameter update unit 48), the output unit 50, and the extraction unit 60 are realized by a processor (for example, a central processing unit (CPU) or a graphics processing unit (GPU)) of a computer that operates according to a program (signal extraction learning program).

For example, the program may be stored in a storage unit (not illustrated) included in the signal extraction system 100, and the processor may read the program and operate as the neural network input unit 10, the anchor signal input unit 20, the mixed signal input unit 30, the learning unit 40 (more specifically, the reconstruction mask estimation unit 42, the signal classification unit 44, the loss calculation unit 46, and the parameter update unit 48), the output unit 50, and the extraction unit 60 according to the program. A function of the signal extraction system 100 may be provided in a software as a service (SaaS) format.

Each of the neural network input unit 10, the anchor signal input unit 20, the mixed signal input unit 30, the learning unit 40 (more specifically, the reconstruction mask estimation unit 42, the signal classification unit 44, the loss calculation unit 46, and the parameter update unit 48), the output unit 50, and the extraction unit 60 may be realized by dedicated hardware. A part or all of the constituent components of each device may be realized by a general-purpose or dedicated circuitry, a processor, or a combination thereof. These constituent components may be realized by a single chip, or may be realized by a plurality of chips connected via a bus. A part or all of the constituent components of each device may be realized by a combination of the above-described circuitries and a program.

When a part or all of the constituent components of the signal extraction system 100 are realized by a plurality of information processing devices, circuitries, and the like, the plurality of information processing devices, circuitries, and the like may be centrally arranged or may be distributedly arranged. For example, the information processing devices, the circuitries, and the like may be realized as a form in which a client and server system, a cloud computing system, and the like are connected to each other via a communication network.

Next, an operation of the signal extraction system 100 according to the exemplary embodiment will be described.

Figure 3:
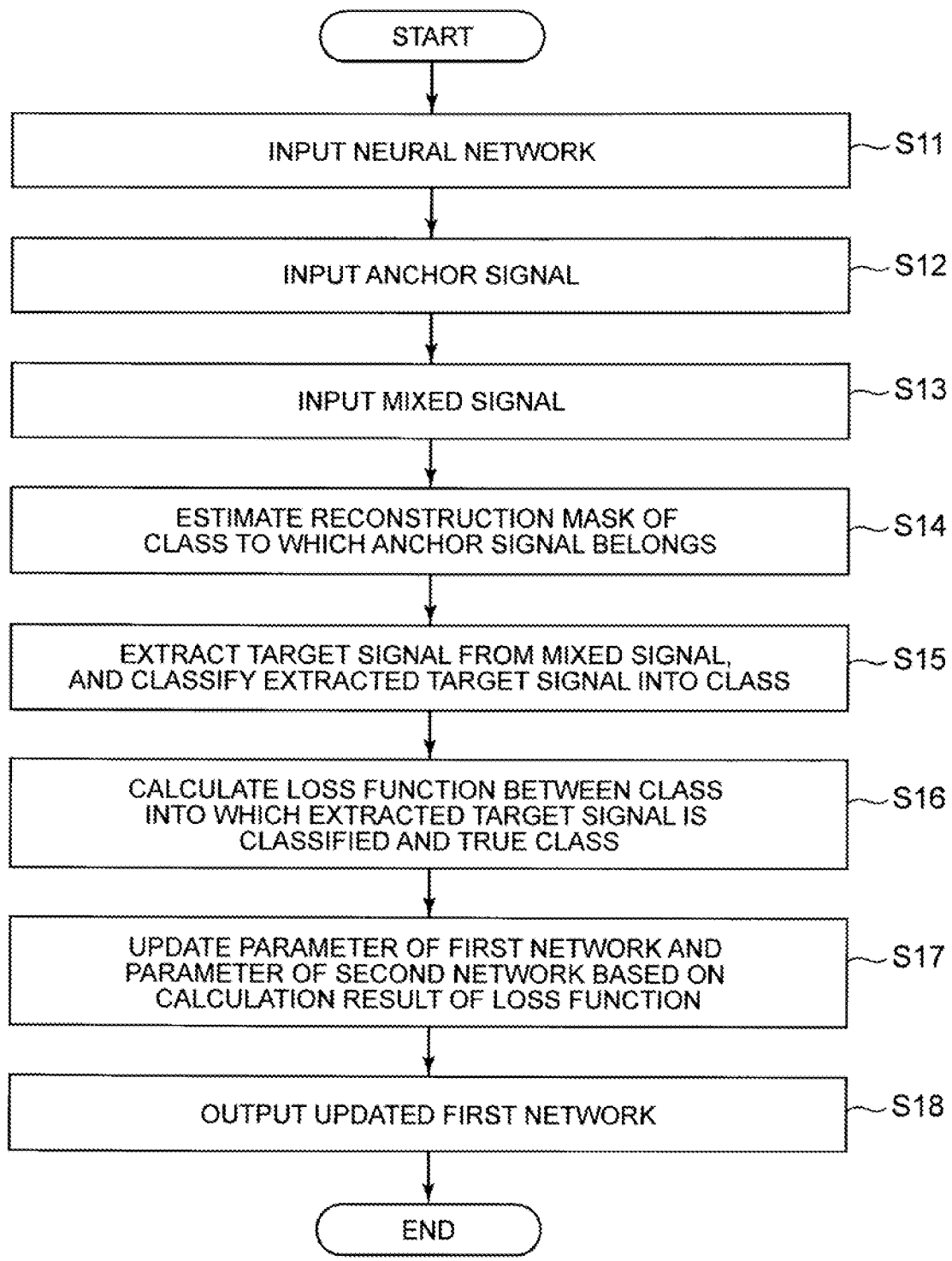
FIG. 3 It depicts a flowchart illustrating an operation example of the signal extraction system according to the first exemplary embodiment.

FIG. 3 is a flowchart illustrating an operation example of the signal extraction system 100 according to the exemplary embodiment. The neural network input unit 10 inputs the neural network in which the first network and the second network are combined (step S11).

The anchor signal input unit 20 inputs the anchor signal (step S12), and the mixed signal input unit 30 inputs the mixed signal (step S13). The learning unit 40 (more specifically, the reconstruction mask estimation unit 42) applies the input anchor signal and mixed signal to the first network to estimate the reconstruction mask of the class to which the anchor signal belongs (step S14).

The learning unit 40 (more specifically, the signal classification unit 44) applies the mixed signal to the estimated reconstruction mask to extract the target signal, and applies the extracted target signal to the second network to classify the extracted target signal into the class (step S15). The learning unit 40 (more specifically, the loss calculation unit 46) calculates the loss function between the class into which the extracted target signal is classified and the true class (step S16).

The learning unit 40 (more specifically, the signal classification unit 44) updates the parameter of the first network and the parameter of the second network in the neural network based on the calculation result of the loss function (step S17). The output unit 50 outputs the updated first network (step S18).

Figure 4:
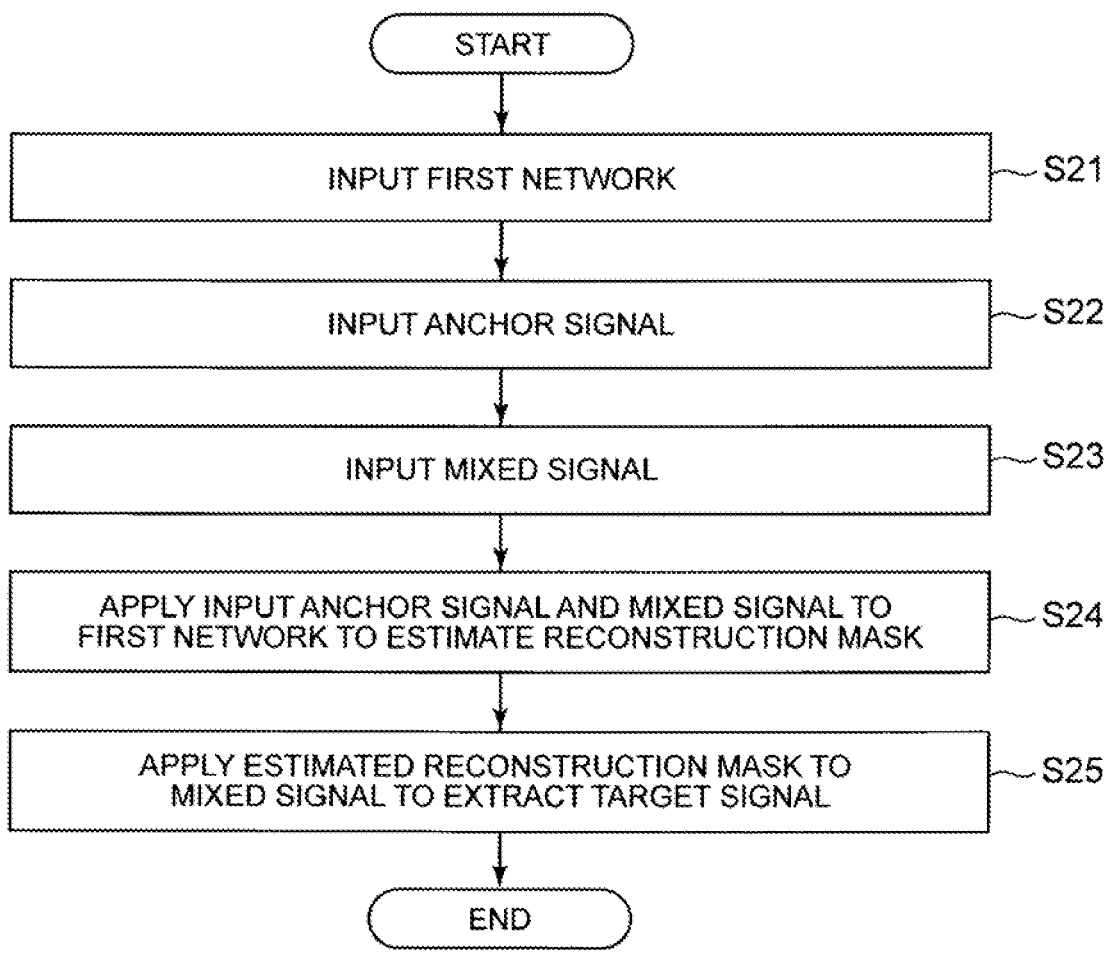
FIG. 4 It depicts a flowchart illustrating another operation example of the signal extraction system according to the first exemplary embodiment.

FIG. 4 is a flowchart illustrating another operation example of the signal extraction system 100 according to the exemplary embodiment. The extraction unit 60 inputs the output first network (step S21). The anchor signal input unit 20 inputs the anchor signal (step S22), and the mixed signal input unit 30 inputs the mixed signal (step S23). The extraction unit 60 applies the input anchor signal and mixed signal to the first network to estimate the reconstruction mask (step S24), and applies the estimated reconstruction mask to the mixed signal to extract the target signal (step S25).

As described above, in the exemplary embodiment, the neural network input unit 10 inputs the neural network in which the first network and the second network are combined, and the reconstruction mask estimation unit 42 applies the anchor signal and the mixed signal to the first network to estimate the reconstruction mask of the class to which the anchor signal belongs. The signal classification unit 44 applies the mixed signal to the estimated reconstruction mask to extract the target signal, and applies the extracted target signal to the second network to classify the target signal into the class. The loss calculation unit 46 calculates the loss function between the class into which the extracted target signal is classified and the true class, and the parameter update unit 48 updates the parameter of the first network and the parameter of the second network in the neural network based on the calculation result of the loss function. Thereafter, the output unit 50 outputs the updated first network.

With such a configuration, the accuracy of the reconstruction mask estimated by the first network can be improved. As a result, the signal belonging to each class can be accurately extracted from the observed mixed signal.

The signal extraction system according to the exemplary embodiment can be realized as, for example, a system that extracts a signal of any class as illustrated below.

System that extracts signal of class of specific speaker, gender, age, language, or emotion from mixed utterance System that extracts signal of class of specific instrument from mixed music System that extracts signal of class of specific acoustic event, for example, explosion sound or sound of gunfire from mixed audio System that extracts signal of class of specific electrical device from flow of mixed electricity System that extracts signal of class of specific communication device from mixed radio wave Second Exemplary Embodiment Next, a second exemplary embodiment of the signal extraction system according to the disclosure will be described. The signal belonging to each class can be accurately extracted from the mixed signal by using the reconstruction mask estimated by the first exemplary embodiment. In the exemplary embodiment, a method for more accurately extracting the target signal of each speaker from the audio signal will be described.

In a procedure of extracting the target signal from the audio signal, in general, utterances (segments) of individual speakers are estimated independently. In a normal conversation, in general, the speakers speak alternately and exclusively.

Figure 5:
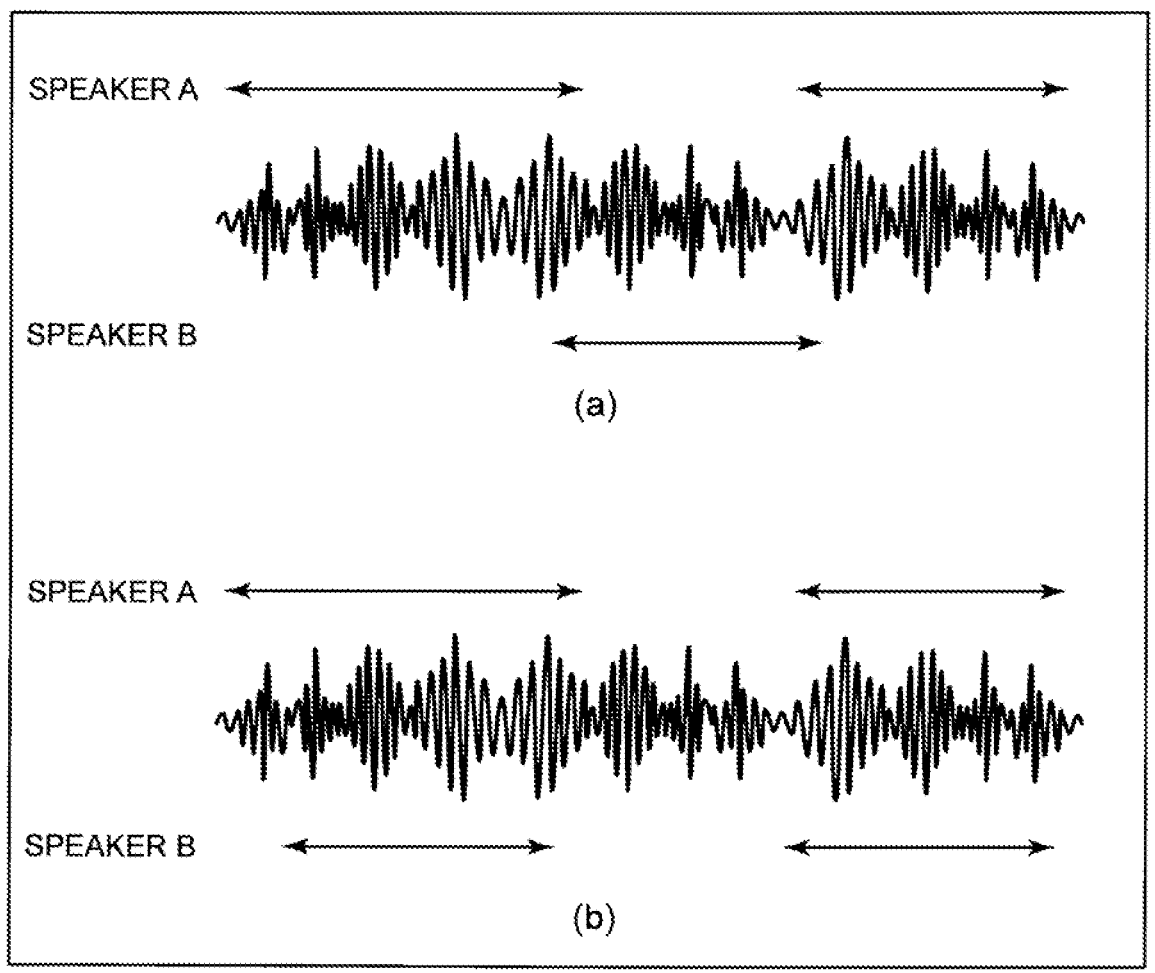
FIG. 5 It depicts an explanatory diagram illustrating an example of a signal as an extraction target in a conversation.

FIG. 5 is an explanatory diagram illustrating an example of the signals as the extraction targets in a conversation. As illustrated in FIG. 5(a), in general, signals of a plurality of speakers (speaker A and speaker B) are observed alternately and exclusively, and are rarely observed simultaneously as illustrated in FIG. 5(b). In the exemplary embodiment, a method for correcting the reconstruction mask in a relation to another signal will be described focusing on the characteristics in the conversation.

Figure 6:
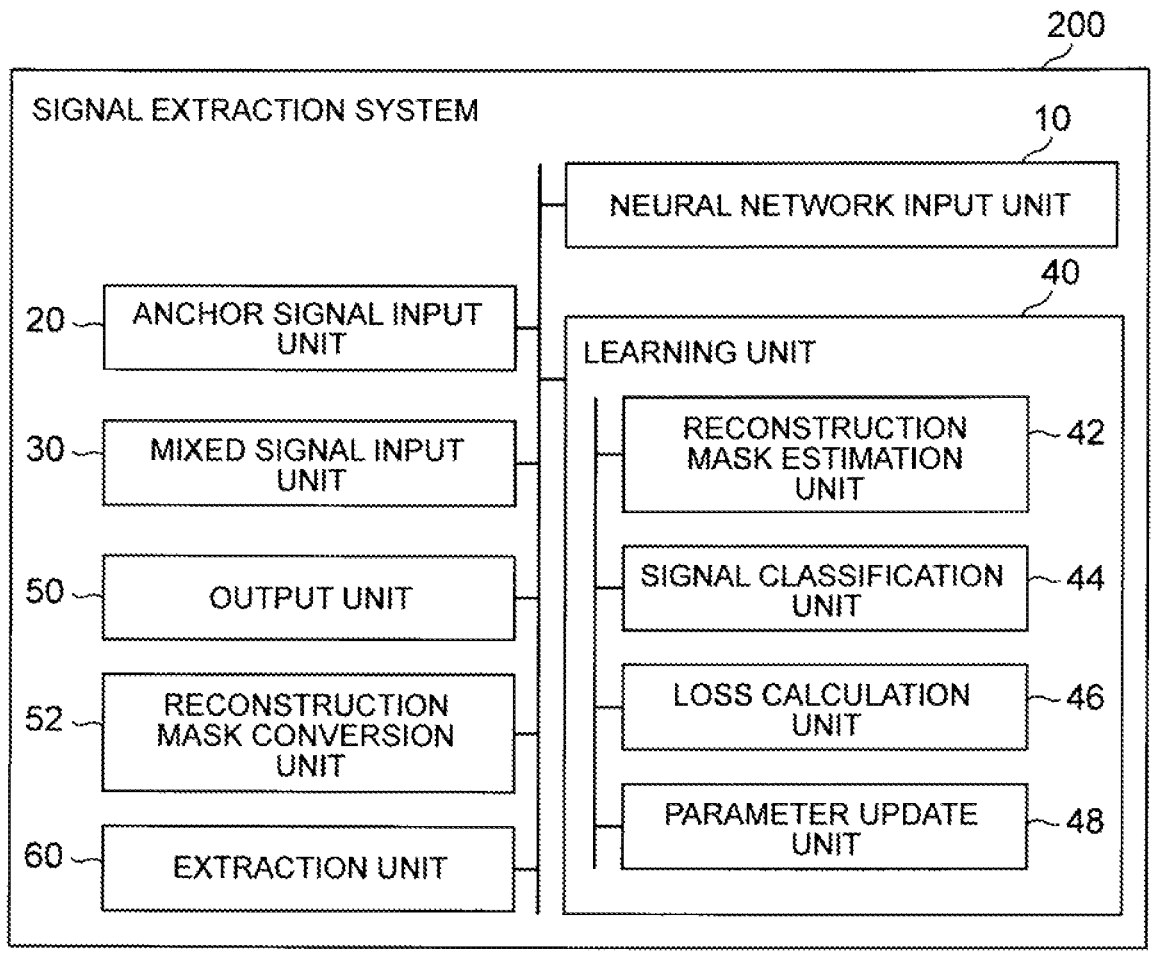
FIG. 6 It depicts a block diagram illustrating a configuration example of a second exemplary embodiment of the signal extraction system according to the disclosure.

FIG. 6 is a block diagram illustrating a configuration example of the second exemplary embodiment of the signal extraction system according to the disclosure. A signal extraction system 200 according to the exemplary embodiment includes a neural network input unit 10, an anchor signal input unit 20, a mixed signal input unit 30, a learning unit 40, an output unit 50, a reconstruction mask conversion unit 52, and an extraction unit 60.

That is, the signal extraction system 200 according to the exemplary embodiment is different from the signal extraction system 100 according to the first exemplary embodiment in that the reconstruction mask conversion unit 52 is further provided. Other configurations are the same as those of the first exemplary embodiment.

In the exemplary embodiment, the signal extraction system 200 changes at least one reconstruction mask by using reconstruction masks of a plurality of speakers. Thus, the anchor signal input unit 20 inputs anchor signals of a plurality of speakers. In the following description, although a case where reconstruction masks of two speakers are used will be described, the same applies to a case where there are three or more speakers. That is, the anchor signal input unit 20 inputs the anchor signals of the two speakers.

The mixed signal input unit 30 inputs the mixed signal.

The learning unit 40 estimates a first network for each speaker based on each input anchor signal and the input mixed signal, and the output unit 50 outputs each generated first network.

The reconstruction mask conversion unit 52 inputs the plurality of generated first networks, and applies the anchor signal and the mixed signal of each speaker to the first network corresponding to each speaker to estimate the reconstruction mask. The reconstruction mask conversion unit 52 converts at least one of the estimated reconstruction masks based on a degree of similarity to the other reconstruction mask. Specifically, the reconstruction mask conversion unit 52 converts the reconstruction mask such that as a degree of similarity to a frequency of the other reconstruction mask becomes higher, a degree of reliability of the frequency becomes lower.

This conversion by the reconstruction mask conversion unit 52 means conversion so as not to use a target reconstruction mask as similar to the other reconstruction mask. The fact that the reconstruction mask is similar to the other reconstruction mask means that the signals of similar frequencies are to be extracted with reconstruction masks of different speakers. However, since such a signal is rarely generated in the conversation, it is intended to improve accuracy by lowering the degree of reliability of such a reconstruction mask.

A method by which the reconstruction mask conversion unit 52 calculates the degree of similarity is arbitrary. A function for calculating the degree of similarity is denoted by Sim, a set of reconstruction masks of the speaker A is denoted by $M_{f,t}^A$, and a set of reconstruction masks of the speaker B is denoted by $M_{f,t}^B$. At this time, a degree of similarity $s_f$ between the frequencies is expressed by Expression 4 to be illustrated below.

[Math. 4]

$$s_f = Sim(M_{f,t}^A, M_{f,t}^B) \qquad \text{(Equation 4)}$$

For example, the reconstruction mask conversion unit 52 may calculate a degree of cosine similarity as the degree of similarity. In this case, the degree of similarity $s_f$ is calculated by Expression 5 to be illustrated below.

[Math. 5]

$$Sim(M_{f,t}^A, M_{f,t}^B) = \frac{\sum_t M_{f,t}^A \cdot M_{f,t}^B}{\sqrt{\sum_t M_{f,t}^{A\,2}} \sqrt{\sum_t M_{f,t}^{B\,2}}} \qquad \text{(Equation 5)}$$

The reconstruction mask conversion unit 52 converts the reconstruction mask such that as the calculated degree of similarity becomes higher, the degree of reliability becomes lower. For example, when the reconstruction mask of any speaker is $M_{f,t}^*$, the reconstruction mask conversion unit 52 may convert the reconstruction mask by using Expression 6 to be illustrated below.

[Math. 6]

$$s_f : M_{f,t}^* \leftarrow \frac{\alpha}{s_f} M_{f,t}^* \qquad \text{(Equation 6)}$$

In Expression 6 described above, α is a normalization coefficient and is calculated by Equation 7 to be illustrated below.

[Math. 7]

$$\alpha = \sqrt{\sum_f s_f^2} \qquad \text{(Equation 7)}$$

(Equation 7)

The extraction unit 60 extracts the target signal by using the converted reconstruction mask.

The neural network input unit 10, the anchor signal input unit 20, the mixed signal input unit 30, the learning unit 40 (more specifically, the reconstruction mask estimation unit 42, the signal classification unit 44, the loss calculation unit 46, and the parameter update unit 48), the output unit 50, the reconstruction mask conversion unit 52, and the extraction unit 60 are realized by a processor of a computer that operates according to a program (signal extraction learning program).

Figure 7:
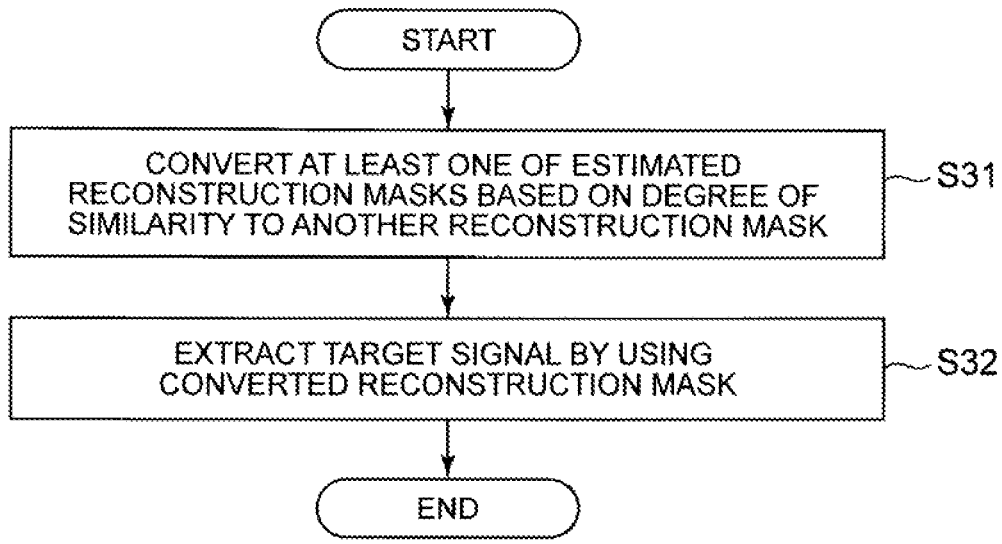
FIG. 7 It depicts a flowchart illustrating an operation example of the signal extraction system according to the second exemplary embodiment.

Next, an operation of the signal extraction system 200 according to the exemplary embodiment will be described. FIG. 7 is a flowchart illustrating an operation example of the signal extraction system 200 according to the exemplary embodiment. Here, it is assumed that the processing of the flowchart illustrated in FIG. 3 is executed and the reconstruction mask for each speaker is generated.

The reconstruction mask conversion unit 52 converts at least one of the estimated reconstruction masks based on the degree of similarity to the other reconstruction mask (step S31). The extraction unit 60 extracts the target signal by using the converted reconstruction mask (step S32).

As described above, in the exemplary embodiment, the reconstruction mask conversion unit 52 converts at least one of the estimated reconstruction masks based on the degree of similarity to the other reconstruction masks, and the extraction unit 60 extracts the target signal by using the converted reconstruction mask. Thus, in addition to the effects of the first exemplary embodiment, it is possible to extract the utterance of each speaker in consideration of the nature of the conversation.

Figure 8:
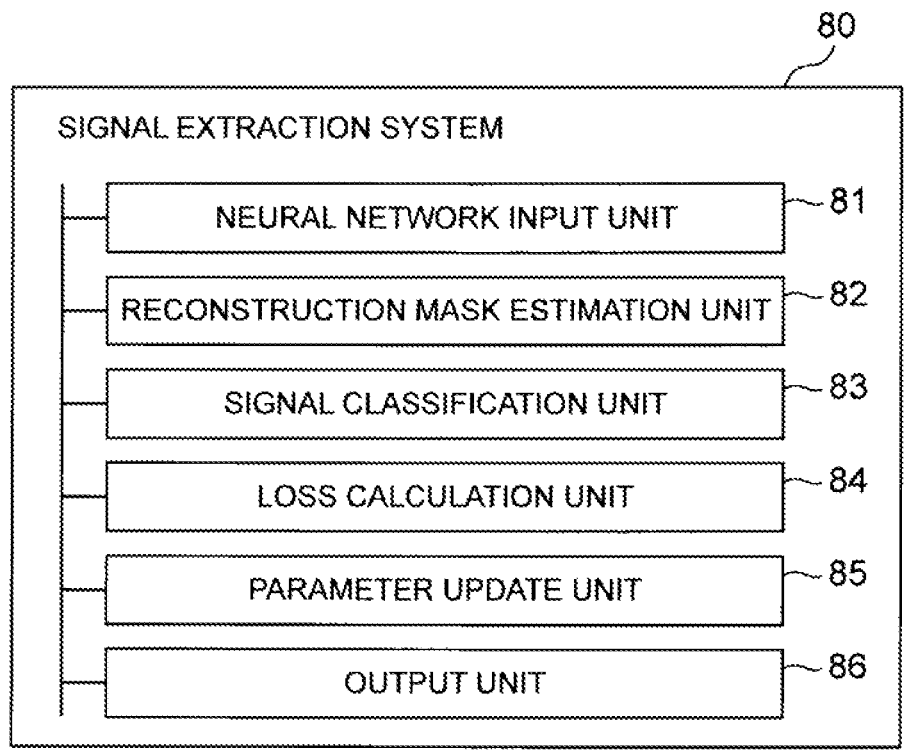
FIG. 8 It depicts is a block diagram illustrating an outline of the signal extraction system according to the disclosure.

Next, an outline of the disclosure will be described. FIG. 8 is a block diagram illustrating an outline of the signal extraction system according to the disclosure. A signal extraction system 80 (for example, the signal extraction system 100) according to the disclosure includes a neural network input unit 81 (for example, the neural network input unit 10) that inputs the neural network (for example, the neural network N3 illustrated in FIG. 2) in which the first network (for example, TDNN, the first network N1 illustrated in FIG. 2) having the layer for inputting the anchor signal belonging to the predetermined class (for example, the certain speaker) and the mixed signal (for example, the audio stream) including the target signal belonging to the class (actual utterance of the certain speaker) and the layer for outputting, as the estimation result, the reconstruction mask indicating the time-frequency domain in which the target signal is present in the mixed signal and the second network (for example, the second network N2 illustrated in FIG. 2) having the layer for inputting the target signal extracted by applying the mixed signal to the reconstruction mask and the layer for outputting the result obtained by classifying the input target signal into the predetermined class are combined, a reconstruction mask estimation unit 82 (for example, the reconstruction mask estimation unit 42) that applies the anchor signal and the mixed signal to the first network to estimate the reconstruction mask of the class to which the anchor signal belongs, a signal classification unit 83 (for example, the signal classification unit 44) that applies the mixed signal to the estimated reconstruction mask to extract the target signal, and applies the extracted target signal to the second network to classify the target signal into the class, a loss calculation unit 84 (for example, the loss calculation unit 46) that calculates the loss function between the class into which the extracted target signal is classified and the true class (for example, the class to which the input anchor signal belongs), a parameter update unit 85 (for example, the parameter update unit 48) that updates the parameter of the first network and the parameter of the second network in the neural network based on the calculation result of the loss function, and an output unit 86 (for example, the output unit 50) that outputs the updated first network.

With such a configuration, the signal belonging to each class can be accurately extracted from the observed signal.

The signal extraction system 80 (for example, the signal extraction system 200) may include a reconstruction mask conversion unit (for example, the reconstruction mask conversion unit 52) that converts at least one of the plurality of estimated reconstruction masks based on the degree of similarity to the other reconstruction mask, and an extraction unit (for example, the extraction unit 60) that extracts the target signal by using the converted reconstruction mask.

Specifically, the reconstruction mask conversion unit may convert the reconstruction mask such that as the degree of similarity to the frequency of the other reconstruction mask becomes higher, the degree of reliability of the frequency becomes lower.

The parameter update unit 85 may update the parameter of the first network and the parameter of the second network in the neural network so as to reduce the loss calculated by the loss function.

The neural network input unit 81 may input the neural network in which the second network having the layer in which the output corresponding to the number of classes assumed as the extraction target is set is combined.

For example, in a scene in which the audio of the speaker is extracted, the reconstruction mask estimation unit 82 may apply the anchor signal and the audio stream indicating the utterance of the speaker to the first network to estimate the reconstruction mask of the speaker. The signal classification unit 83 may apply the mixed signal to the estimated reconstruction mask to extract the spectrogram of the speaker, and may apply the extracted spectrogram to the second network to classify the speaker.

Figure 9:
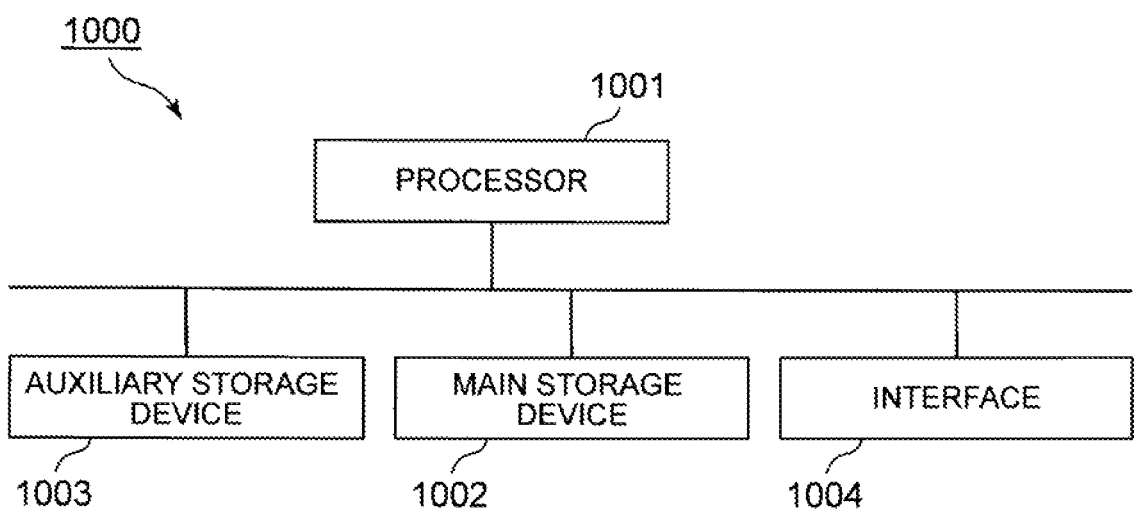
FIG. 9 It depicts a schematic block diagram illustrating a configuration of a computer according to at least one exemplary embodiment.
Figure 10:
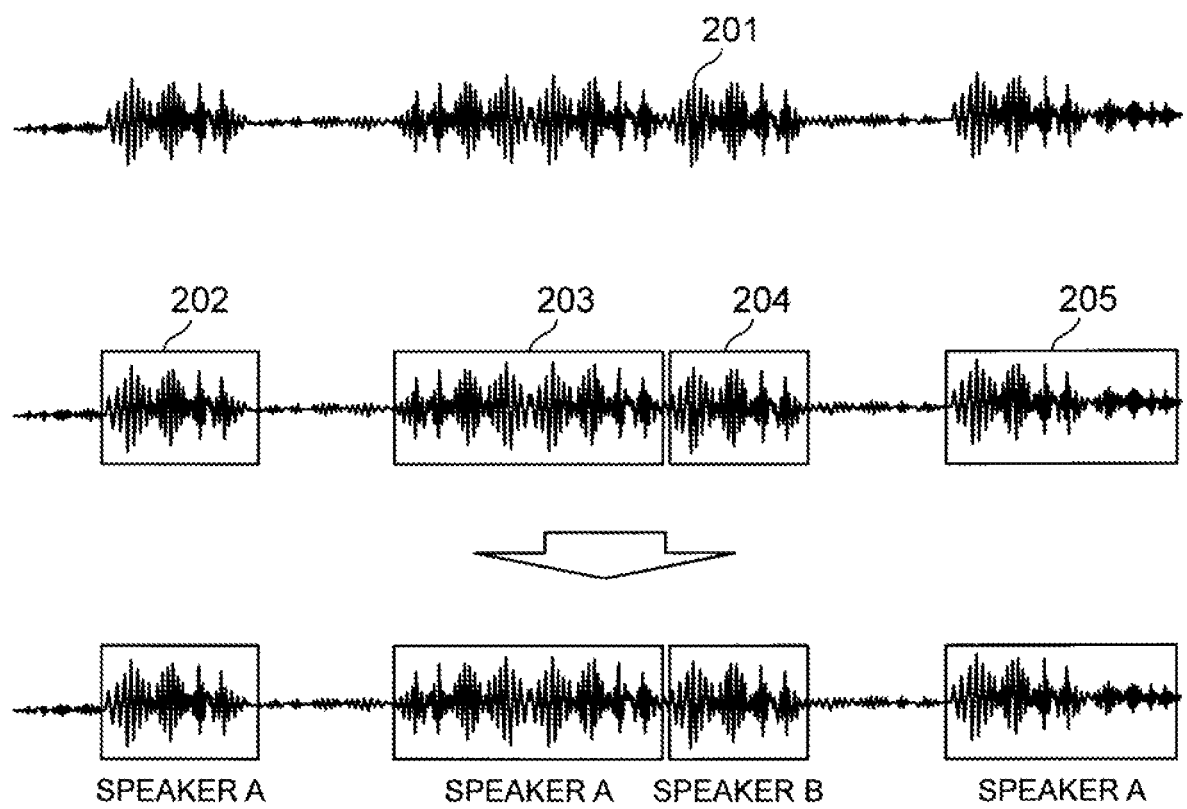
FIG. 10 It depicts an explanatory diagram illustrating a method for specifying an audio signal of a speaker from segmented audio signals.
Figure 11:
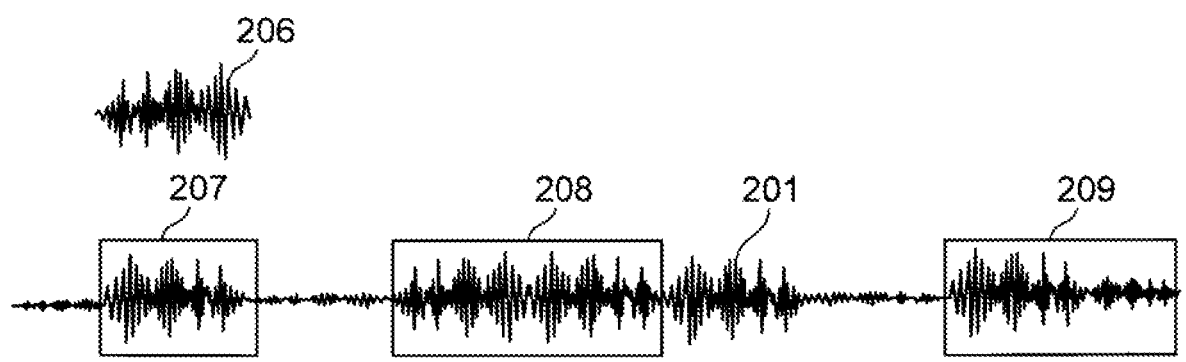
FIG. 11 It depicts an explanatory diagram illustrating a method for specifying an audio signal of a speaker by using an anchor.

FIG. 9 is a schematic block diagram illustrating a configuration of a computer according to at least one exemplary embodiment. A computer 1000 includes a processor 1001, a main storage device 1002, an auxiliary storage device 1003, and an interface 1004.

The signal extraction system described above is implemented in the computer 1000. An operation of each processing unit described above is stored in the auxiliary storage device 1003 in the form of the program (signal extraction learning program). The processor 1001 reads out the program from the auxiliary storage device 1003, expands the program in the main storage device 1002, and executes the above processing according to the program.

In at least one exemplary embodiment, the auxiliary storage device 1003 is an example of anon-transitory tangible medium. As another example of the non-transitory tangible medium, there are a magnetic disk, a magneto-optical disk, a compact disc read-only memory (CD-ROM), a digital versatile disk read-only memory (DVD-ROM), a semiconductor memory, and the like connected via the interface 1004. When this program is distributed to the computer 1000 via a communication line, the computer 1000 to which the program is distributed may expand the program in the main storage device 1002 and may execute the above-described processing.

The program may be used for realizing a part of the functions described above. The program may be a so-called difference file (difference program) that realizes the above-described functions in combination with another program already stored in the auxiliary storage device 1003.

REFERENCE SIGNS LIST

10 Neural network input unit
20 Anchor signal input unit
30 Mixed signal input unit
40 Learning unit
42 Reconstruction mask estimation unit
44 Signal classification unit
46 Loss calculation unit
48 Parameter update unit
50 Output unit
52 Reconstruction mask conversion unit
60 Extraction unit
100, 200 Signal extraction system

What is claimed is:

1. A signal extraction system comprising:
a memory storing instructions; and
one or more processors configured to execute the instructions to:
input a neural network in which a first network having a layer for inputting an anchor signal belonging to a predetermined class and a mixed signal including a target signal belonging to the class and a layer for outputting, as an estimation result, a reconstruction mask indicating a time-frequency domain in which the target signal is present in the mixed signal and a second network having a layer for inputting the target signal extracted by applying the mixed signal to the reconstruction mask and a layer for outputting a result obtained by classifying the input target signal into a predetermined class are combined;
apply an anchor signal and the mixed signal to the first network to estimate a reconstruction mask of a class to which the anchor signal belongs;
apply the mixed signal to the estimated reconstruction mask to extract a target signal, and apply the extracted target signal to the second network to classify the target signal into a class;
calculate a loss function between the class to which the extracted target signal is classified and a true class;
update a parameter of the first network and a parameter of the second network in the neural network based on the calculation result of the loss function; and
output the updated first network.

2. The signal extraction system according to claim 1, wherein the processor further executes instructions to:
convert at least one of a plurality of the estimated reconstruction masks based on a degree of similarity to another reconstruction mask; and
extract a target signal by using the converted reconstruction mask.

3. The signal extraction system according to claim 2, wherein the processor further executes instructions to convert the reconstruction mask such that as a degree of similarity to a frequency of another reconstruction mask becomes higher, a degree of reliability of the frequency becomes lower.

4. The signal extraction system according to claim 1, wherein the processor further executes instructions to update the parameter of the first network and the parameter of the second network in the neural network such that a loss calculated by the loss function becomes smaller.

5. The signal extraction system according to claim 1, wherein the processor further executes instructions to input a neural network in which a second network having a layer to which an output corresponding to the number of classes assumed as extraction targets is set is combined.

6. The signal extraction system according to claim 1, wherein the processor further executes instructions to:
apply an anchor signal indicating an utterance of a speaker and an audio stream to the first network to estimate a reconstruction mask of the speaker, and
apply the mixed signal to the estimated reconstruction mask to extract a spectrogram of the speaker, and apply the extracted spectrogram to the second network to classify the speaker.

7. A signal extraction learning method comprising:
inputting a neural network in which a first network having a layer for inputting an anchor signal belonging to a predetermined class and a mixed signal including a target signal belonging to the class and a layer for outputting, as an estimation result, a reconstruction mask indicating a time-frequency domain in which the target signal is present in the mixed signal and a second network having a layer for inputting the target signal extracted by applying the mixed signal to the reconstruction mask and a layer for outputting a result obtained by classifying the input target signal into a predetermined class are combined;
applying an anchor signal and the mixed signal to the first network to estimate a reconstruction mask of a class to which the anchor signal belongs;
applying the mixed signal to the estimated reconstruction mask to extract a target signal, and applying the extracted target signal to the second network to classify the target signal into a class;
calculating a loss function between the class to which the extracted target signal is classified and a true class;
updating a parameter of the first network and a parameter of the second network in the neural network based on the calculation result of the loss function; and
outputting the updated first network.

8. The signal extraction learning method according to claim 7, further comprising:
converting at least one of a plurality of the estimated reconstruction masks based on a degree of similarity to another reconstruction masks; and
extracting a target signal by using the converted reconstruction mask.

9. A non-transitory computer readable information recording medium storing a signal extraction learning program, when executed by a processor, that performs a method for:
inputting a neural network in which a first network having a layer for inputting an anchor signal belonging to a predetermined class and a mixed signal including a target signal belonging to the class and a layer for outputting, as an estimation result, a reconstruction mask indicating a time-frequency domain in which the target signal is present in the mixed signal and a second network having a layer for inputting the target signal extracted by applying the mixed signal to the reconstruction mask and a layer for outputting a result obtained by classifying the input target signal into a predetermined class are combined;
applying an anchor signal and the mixed signal to the first network to estimate a reconstruction mask of a class to which the anchor signal belongs;
applying the mixed signal to the estimated reconstruction mask to extract a target signal, and applying the extracted target signal to the second network to classify the target signal into a class;
calculating a loss function between the class to which the extracted target signal is classified and a true class;

updating a parameter of the first network and a parameter of the second network in the neural network based on the calculation result of the loss function; and outputting the updated first network.

10. The non-transitory computer readable information recording medium according to claim 9, further comprising:

converting at least one of a plurality of the estimated reconstruction masks based on a degree of similarity to another reconstruction mask; and extracting a target signal by using the converted reconstruction mask.

* * * * *